United States Patent
Pham et al.

(10) Patent No.: US 12,148,905 B2
(45) Date of Patent: Nov. 19, 2024

(54) BATTERY MODULE CELL CARRIER AND METHOD OF ASSEMBLY

(71) Applicant: RIVIAN IP HOLDINGS, LLC, Irvine, CA (US)

(72) Inventors: Brian Pham, Westminster, CA (US); Tyler Jacobs, Redondo Beach, CA (US); Chad Jackson Hardgrove, Tustin, CA (US)

(73) Assignee: RIVIAN IP HOLDINGS, LLC, Irvine, CA (US)

( * ) Notice: Subject to any disclaimer, the term of this patent is extended or adjusted under 35 U.S.C. 154(b) by 239 days.

(21) Appl. No.: 17/675,699

(22) Filed: Feb. 18, 2022

(65) Prior Publication Data
US 2023/0063609 A1    Mar. 2, 2023

Related U.S. Application Data

(60) Provisional application No. 63/239,589, filed on Sep. 1, 2021.

(51) Int. Cl.
| | |
|---|---|
| H01M 10/00 | (2006.01) |
| H01M 10/613 | (2014.01) |
| H01M 50/256 | (2021.01) |
| H01M 50/258 | (2021.01) |

(52) U.S. Cl.
CPC ....... *H01M 10/613* (2015.04); *H01M 50/256* (2021.01); *H01M 50/258* (2021.01)

(58) Field of Classification Search
CPC . H01M 10/613; H01M 50/256; H01M 50/258
See application file for complete search history.

(56) References Cited

U.S. PATENT DOCUMENTS

| | | | | |
|---|---|---|---|---|
| 2009/0194391 A1* | 8/2009 | Lagneaux | ............... | G01L 5/101 |
| | | | | 198/810.04 |
| 2020/0287183 A1* | 9/2020 | Matsumoto | .............. | B60K 1/04 |

FOREIGN PATENT DOCUMENTS

| | | | | |
|---|---|---|---|---|
| CN | 112602162 A | * | 4/2021 | .......... H01M 10/482 |

OTHER PUBLICATIONS

Bende, Starter Module Adapter, Apr. 2021, See the Abstract. (Year: 2021).*

* cited by examiner

*Primary Examiner* — Anca Eoff
*Assistant Examiner* — Monique M Wills
(74) *Attorney, Agent, or Firm* — Haley Guiliano LLP

(57) ABSTRACT

A cell carrier for a battery module, a battery module, and a method for assembling a battery module. The battery module includes a plurality of pairs of battery cells and the cell carrier. The cell carrier includes a plurality of recesses, each including a first recess portion including a first sidewall portion and a first bottom portion, and a second recess portion including a second sidewall portion and a second bottom portion. The first bottom portion and the second bottom portion of each recess include a shared cutout. For each pair of battery cells, a first end of a first battery cell is coupled to the first recess portion and a first end of a second battery cell is coupled to the second recess portion of a respective recess.

18 Claims, 10 Drawing Sheets

BATTERY MODULE CELL CARRIER AND METHOD OF ASSEMBLY

CROSS-REFERENCE TO RELATED APPLICATION

This application claims priority to U.S. Provisional Patent Application No. 63/239,589, filed on Sep. 1, 2021, the entire contents of which are hereby expressly incorporated by reference in their entirety.

INTRODUCTION

The present disclosure is directed to a cell carrier for a battery module and a method for assembling a battery module, and more particularly to a cell carrier that allows for effective potting of battery cells in a battery module during assembly.

SUMMARY

It is advantageous to package battery cells closely in high-voltage, large-format battery modules to provide high energy density battery modules. Cylindrical battery cells in a battery module may be positioned with cell carriers at both ends of the battery cells to prevent the battery cells from touching each other and short-circuiting or causing thermal runaway. Because cell carriers add size and thickness to the battery module, in some embodiments it is desirable to use only a single cell carrier at one end of the battery cells. Additionally, when a single cell carrier is used, it is desirable in some embodiments to couple the other end of the battery cells to a cooling plate using a thermal interface material. It is also desirable to provide a heat- or fire-resistant barrier between battery cells to reduce or prevent propagation or a thermal event from one cell to other adjacent cells (e.g., by potting the battery cells with a flame retardant potting material). However, the assembly of such a battery module may require additional machinery or manufacturing time to ensure that the battery cells are sufficiently potted and that potting material does not affect the thermal interface between the ends of the battery cells coupled to the cooling plate. Accordingly, in some embodiments, it would be advantageous to provide a carrier layer for a battery module and a method of assembling the battery module that allows for effective potting of the battery cells during the assembly process.

To solve one or more these problems, a battery module cell carrier, a battery module, and a method for assembling the battery module are provided. The battery module includes a cell carrier including one or more cutouts. The one or more cutouts is configured to allow potting to flow to one or more battery cells.

In some embodiments, the one or more cutouts may be located along one or more sidewalls of the cell carrier to increase potting contact with the one or more battery cells.

In some embodiments, the one or more battery cells may include a first battery cell and a second battery cell, and the one or more cutouts may allow the potting to flow between the first battery cell and the second battery cell.

In some embodiments, the battery module may further include a first cylindrical sidewall for a first battery cell and a second cylindrical sidewall for a second battery cell. The first cylindrical sidewall and the second cylindrical sidewall may form a convex portion, and the convex portion may allow the potting to flow between the first battery cell and the second battery cell.

In some embodiments, the battery module may further include a crush point in a recess configured to support the one or more battery cells. The crush point may be configured to modify its shape based on the one or more battery cells being inserted into the recess.

In some embodiments, the battery module may further include a second crush point configured to modify its shape based on the one or more battery cells being inserted in the recess. The crush point and the second crush point may be spaced apart along a sidewall that supports the one or more battery cells.

In some embodiments, the battery module may further include a first recess including a first sidewall and a first bottom, and a second recess including a second sidewall and a second bottom. The first bottom and the second bottom may include a shared cutout of the one or more cutouts. The first recess may be configured to receive a first battery cell of the one or more battery cells, and the second recess may be configured to receive a second battery cell of the one or more battery cells.

In some embodiments, when the first battery cell is positioned in the first recess and a second battery cell is positioned in the second recess, the potting may be applied through the shared cutout to pot the first and second battery cells.

In some embodiments, a battery module may be provided. The battery module includes a plurality of pairs of battery cells and a cell carrier. The carrier layer includes a plurality of recesses, each including a first recess portion including a first sidewall portion and a first bottom portion, and a second recess portion including a second sidewall portion and a second bottom portion. The first bottom portion and the second bottom portion of each recess include a shared cutout. For each pair of battery cells, a first end of a first battery cell is coupled to the first recess portion and a first end of a second battery cell is coupled to the second recess portion of a respective recess.

In some embodiments, the battery module may further include a potting material disposed between the plurality of pairs of battery cells. The potting material may flow through the shared cutout before curing between the plurality of pairs of battery cells.

In some embodiments, the first sidewall portion may include a first plurality of crush points spaced apart from each other along the first sidewall portion and protruding from the first sidewall portion such that the first plurality of crush points may be configured to at least partially hold the first end of the first battery cell. The second sidewall portion may include a second plurality of crush points spaced apart from each other along the second sidewall portion and protruding from the second sidewall portion such that the second plurality of crush points may be configured to at least partially hold the first end of the second battery cell.

In some embodiments, the battery module may further include a current collector assembly. Rim terminals of each of the first battery cell and the second battery cell may be electrically coupled to the current collector assembly through the shared cutout.

In some embodiments, the first bottom portion may include a first cutout and the second bottom portion may include second cutout. A first center button terminal of the first battery cell may be electrically coupled to the current collector assembly through the shared cutout or the first cutout, and a second center button terminal of the second battery cell may be electrically coupled to the current collector assembly through the shared cutout or the second cutout.

In some embodiments, the battery module may further include a cold plate. For each pair of the battery cells, second ends of the first and second battery cells may be coupled to the cold plate through a thermal interface material.

In some embodiments, a method of manufacturing a battery module is provided. The method includes providing a cell carrier including a plurality of shared cutouts, each shared cutouts providing access to a pair of battery cells, and dispensing a potting material to each of the plurality of shared cutouts.

In some embodiments, the cell carrier may include a first side and a second side opposite the first side, the first side including a plurality of recesses, each including a first recess portion including a first sidewall portion and a first bottom portion, and a second recess portion including a second sidewall portion and a second bottom portion. The first bottom portion and the second bottom portion of each recess may include a shared cutout of the plurality of shared cutouts, and the method may further include providing a plurality of the pairs of battery cells, and inserting, for each pair of battery cells, a first end of a first battery cell into the first recess portion and a first end of a second battery cell into the second recess portion of a respective recess of the plurality of recesses.

In some embodiments, the method may further include attaching a current collector assembly to the second side of the cell carrier and electrically coupling portions of the current collector assembly to the plurality of the pairs of battery cells.

In some embodiments, the method may further include attaching a cooling surface to a second end of each of the plurality of pairs of battery cells.

In some embodiments, the method may further include orienting the battery module into a first orientation in which the second side of the cell carrier is facing up, with respect to gravity. Dispending the potting material to each of the plurality of shared cutouts may include applying the potting material to a top surface of the battery module when the potting material is a liquid.

In some embodiments, the method may further include vibrating the battery module before the potting material cures, and curing the potting material.

BRIEF DESCRIPTION OF THE DRAWINGS

The above and other objects and advantages of the present disclosure will be apparent upon consideration of the following detailed description, taken in conjunction with the accompanying drawings, in which like reference characters refer to like parts throughout, and in which.

DETAILED DESCRIPTION

Figure 1:
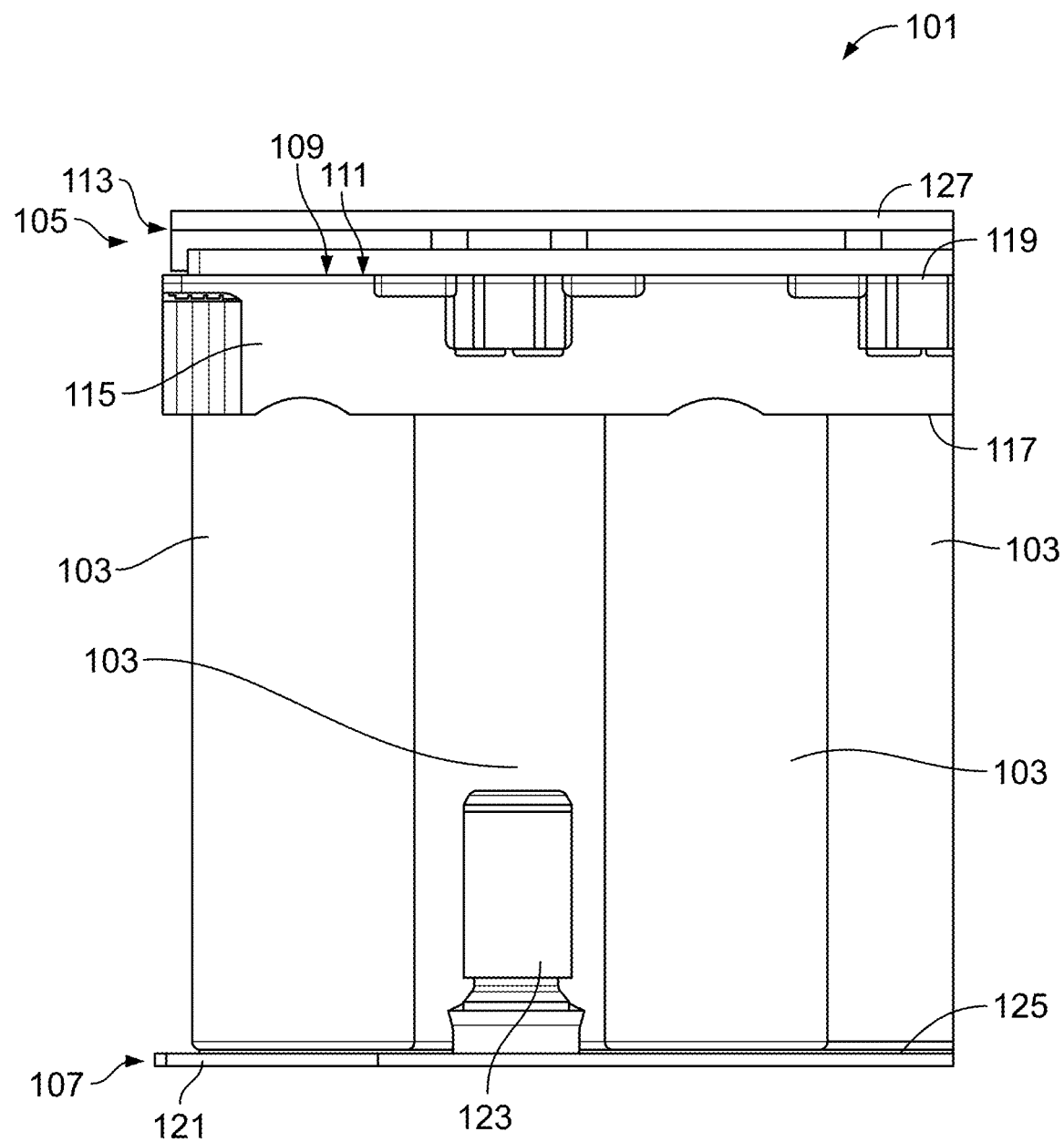
FIG. 1 shows a partial exploded view of a battery module, in accordance with some embodiments of the present disclosure.

FIG. 1 shows a partial view of a battery module 101, in accordance with some embodiments of the present disclosure. As shown, the battery module 101 includes a plurality of battery cells 103. In some embodiments, the battery module 101 includes one or more battery cells 103. Each of the plurality of battery cells 103 may be cylindrical and may have a first end 105 and a second end 107, and a first electric terminal 109 (e.g., a center button terminal) and a second electrical terminal 111. In some embodiments of the present disclosure, each of the plurality of battery cells 103 may have an exposed region of electrically active casing or a conductive jacket that covers at least a portion of the second end 107 and a side of each battery cell 103, forming the second electrical terminal 111 (e.g., a rim terminal). As shown, the battery module 101 also includes a current collector assembly 113. The current collector assembly 113 may include at least one busbar.

As shown, the battery module 101 includes a cell carrier 115 (e.g., a carrier layer) having a first side 117 and a second side 119. The first side 117 may be adjacent to the plurality of battery cells 103 and may have a plurality of recesses that are each configured to receive the first ends 105 of a pair among a plurality of pairs of battery cells 103, as described in greater detail with reference to FIGS. 3A-3B. The second side 119 may be adjacent to the current collector assembly 113. In some embodiments of the present disclosure, the cell carrier 115 may be a clear plastic, such as clear polycarbonate, clear acrylic, clear PET (polyethylene terephthalate), or any other appropriate translucent material. A clear plastic cell carrier may be used to enable the usage of a light-cure adhesive that can be exposed to light through the clear plastic cell carrier. Light-cure adhesives may be advantageous due to their long tack-free times and selectively rapid cure times. In some embodiments, the light-cure adhesive may be a UV light-cure adhesive. In some embodiments, other types of light-cure adhesives may be used.

The battery module 101 may further include a thermal transfer plate, e.g., a cooling plate 121, as shown. In some embodiments of the present disclosure, the thermal transfer plate may be used to selectively heat or cool the battery module 101. The cooling plate 121 may have two cooling fluid ports. Only one cooling fluid port 123 is shown in FIG. 1, where the cooling plate 121 either receives or outputs cooling fluid. In some embodiments of the present disclosure, there may be a thermal interface material 125 that thermally and structurally couples the second end 107 of each of the plurality of battery cells 103 to the cooling plate 121, maintaining the spatial positioning of the second ends 107 of the plurality of battery cells 103 on the cooling plate 121 during operation of the battery module 101, e.g., without the use of a separate cell carrier at the second ends 107 of the plurality of battery cells 103. In some embodiments of the present disclosure, the thermal interface material 125 may be an adhesive. It may be advantageous to minimize the thickness of the thermal interface material 125 for space-saving purposes. It may also be advantageous to minimize the thickness of the thermal interface material 125 to increase the cooling effect from the cooling plate 121 on the ends 107 of the plurality of battery cells 103. However, the thermal interface material 125 should be thick enough to account for worst-case tolerance stack-up, high voltage isolation requirements, and electrical or thermal insulation requirements of the battery module 101. Additionally, as described in greater detail with reference to FIG. 8, the plurality of battery cells 103 may be potted in flame retardant potting material (e.g., polyurethane potting compounds, acrylic potting compounds, epoxy resin potting compounds, silicone potting compounds, low density polyurethane foams, etc.).

The battery module 101 may further include a flex circuit 127 disposed on a top surface of the current collector assembly 113. As illustrated in greater detail with reference to FIG. 2, the flex circuit 127 may include a plurality of conductive traces that electrically couple different portions of the current collector assembly 113 to processing circuitry (e.g., for monitoring parameters of the battery module 101 (e.g., voltage, temperature, current, etc.)

In some embodiments of the present disclosure, the components described above in relation to FIG. 1 may form a first battery submodule that may be combined with a second battery submodule similar to the first battery submodule. For example, the first and second battery submodules may be formed on opposite sides of the cooling plate 121, as described in greater detail with reference to FIG. 7.

Figure 2:
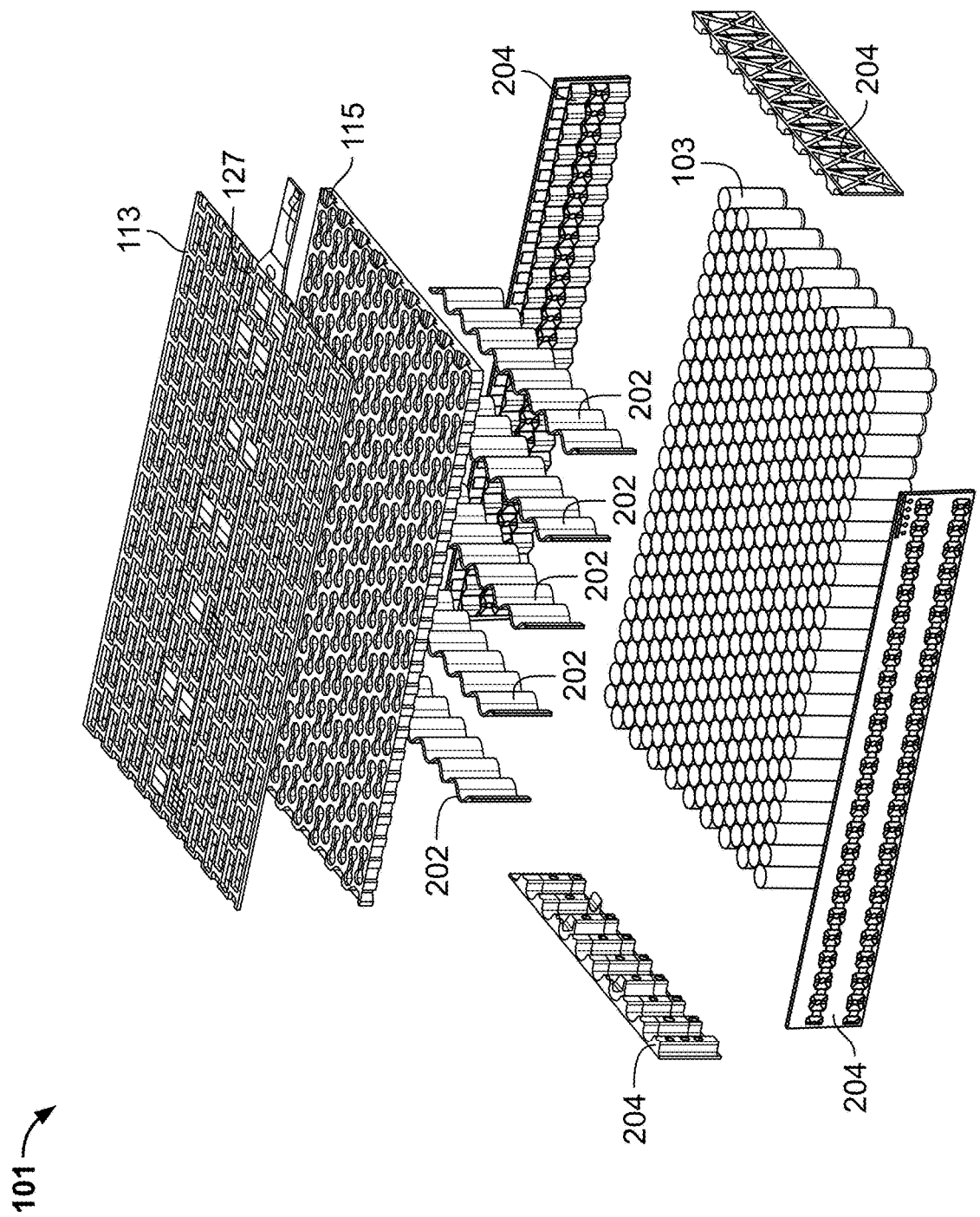
FIG. 2 shows an exploded view of the battery module, in accordance with some embodiments of the present disclosure.

FIG. 2 shows an exploded view of the battery module 101, in accordance with some embodiments of the present disclosure. As shown, the battery module 101 may include a plurality of barrier layers 202 that are inserted between parallel groups of the plurality of battery cells 103 at different operating voltages to provide electrical insulation in the event that the position of any of the plurality of battery cells 103 shifts (e.g., due to vibration or an impact to the battery module 101). In some embodiments of the present disclosure, the barrier layers 202 may comprise a fire-resistant material to prevent a fire from spreading between groups of the plurality of battery cells 103. Although five barrier layers 202 are shown, any number of barrier layers may be used. In some embodiments of the present disclosure, the barrier layers 202 may be optional, depending on the specific requirements of a particular battery module.

Figure 3A:
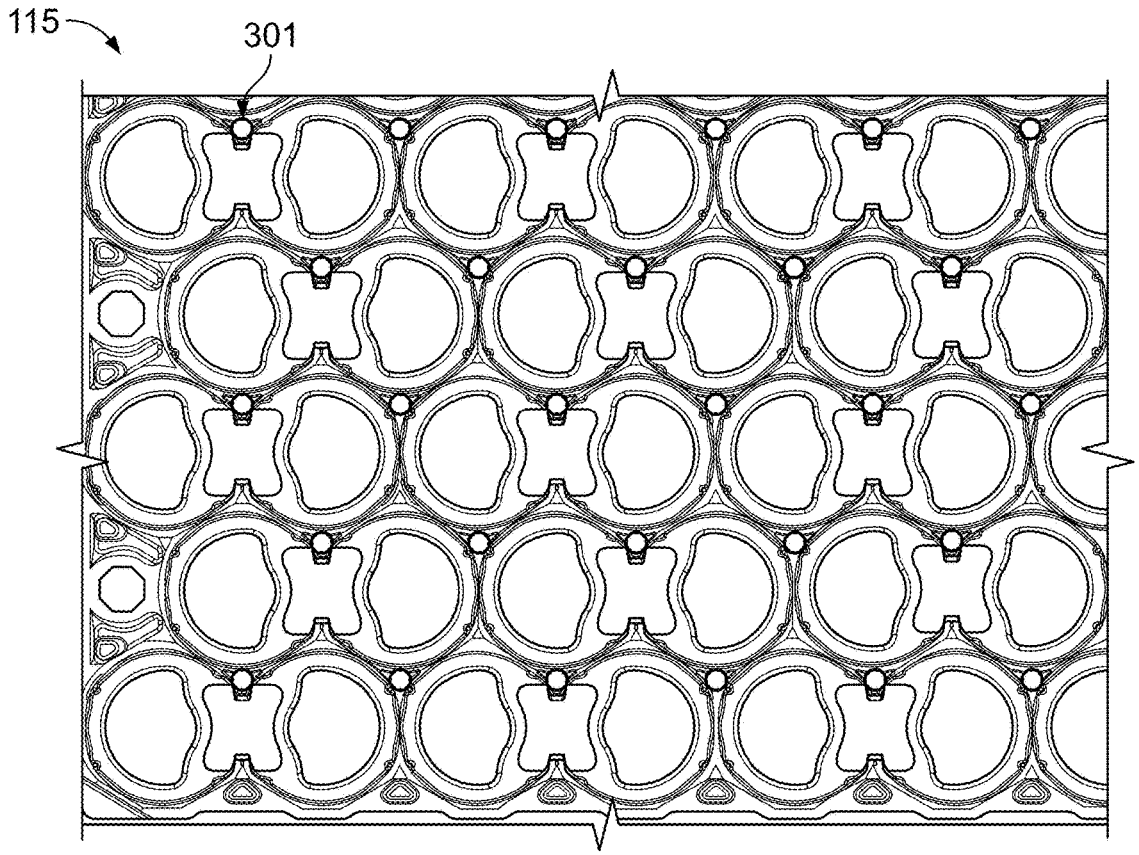
FIG. 3A shows a partial top view of a plurality of recesses of a cell carrier before corresponding pairs of a plurality of battery cells are inserted, in accordance with some embodiments of the present disclosure.
Figure 3B:
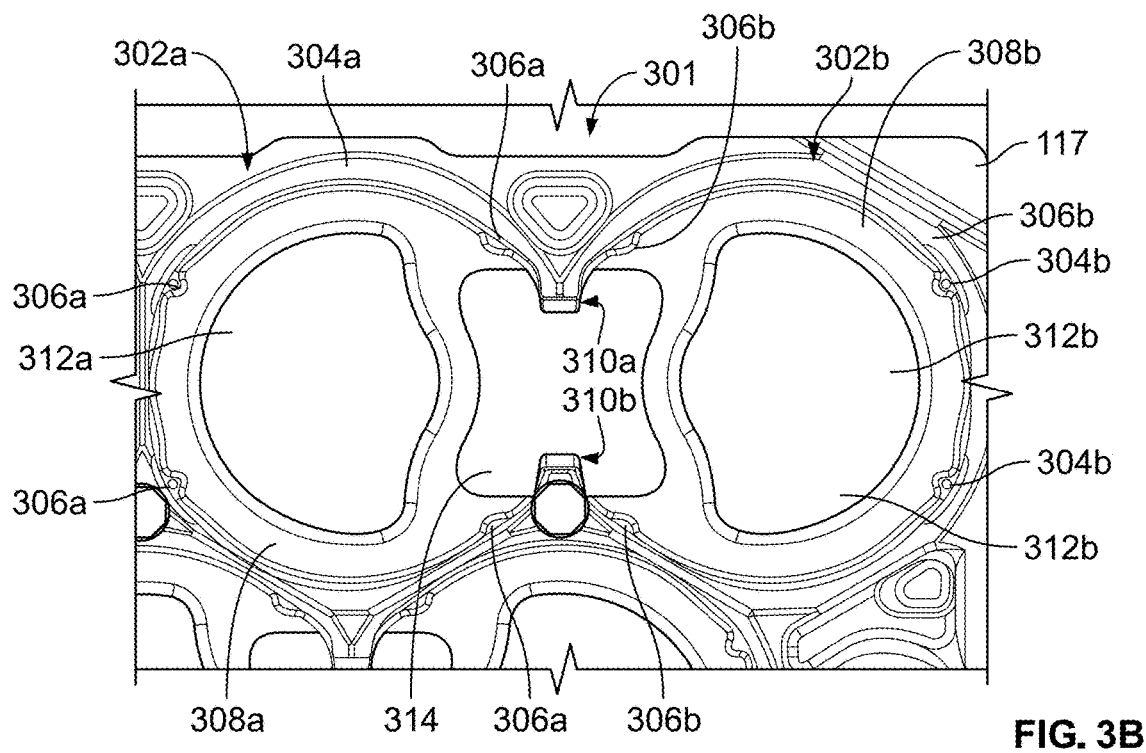
FIG. 3B shows a partial top view of one of the plurality of recesses before a corresponding pair of the plurality of battery cells is inserted, in accordance with some embodiments of the present disclosure.

As shown, the plurality of battery cells 103 may be arranged in a close-hex-pack configuration that corresponds the configuration of recesses in the cell carrier 115, as shown in greater detail with reference to FIGS. 3A and 3B.

As shown, the flex circuit 127 may include a plurality of conductive traces that are positioned above respective projections of a plurality of busbars of the current collector assembly 113.

Figure 5:
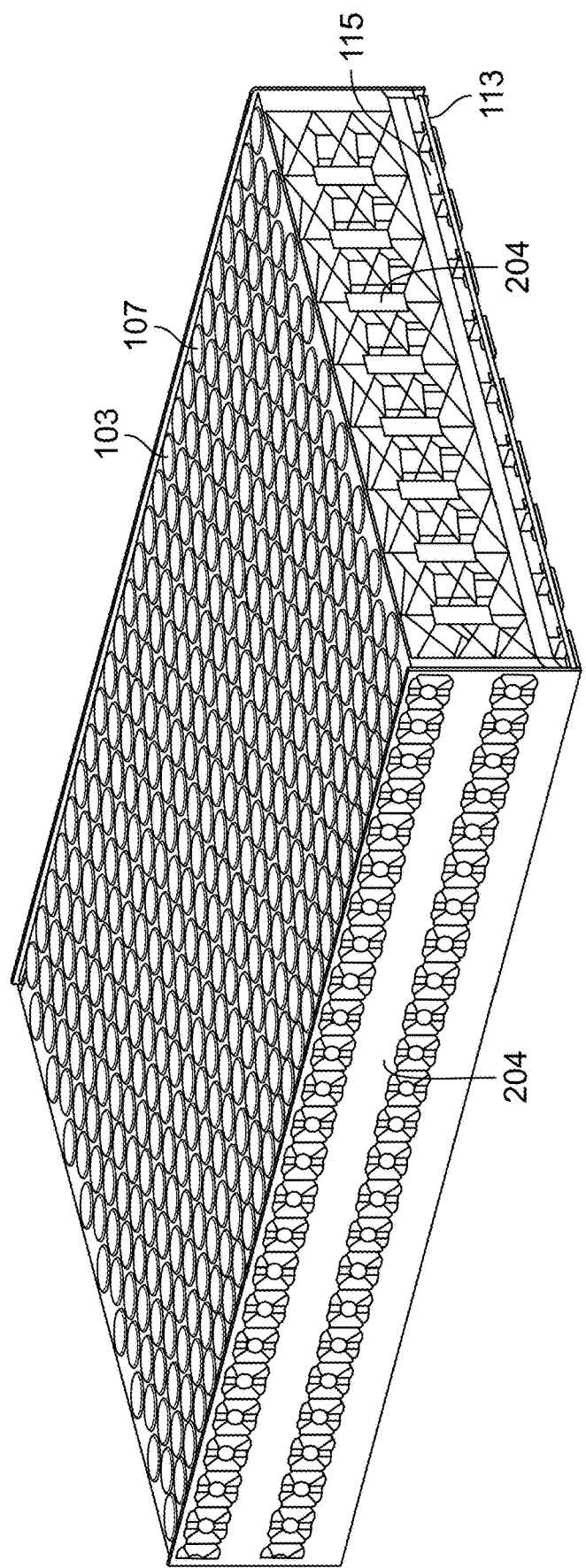
FIG. 5 shows the battery module after pairs of the plurality of battery cells have been coupled to respective recesses of the plurality of recesses, barrier layers have been inserted between parallel groups the battery cells, sidewalls have been coupled to sides of the battery module, and the current collector assembly has been attached to the second side of the cell carrier, in accordance with some embodiment of the present disclosure.

The battery module may further include a plurality of sidewalls 204, as described in greater detail in with reference to FIG. 5. Any one or a combination of the plurality of sidewalls 204 may be referred to herein as one or more sidewalls.

FIG. 3A shows a partial top view of a plurality of recesses 301 of the cell carrier 115 before corresponding pairs of the plurality of battery cells 103 are inserted, and FIG. 3B shows a partial top view of one of the plurality of recesses 301 before a corresponding pair of the plurality of battery cells 103 is inserted, in accordance with some embodiments of the present disclosure. As shown, each of the plurality of recesses 301 may have a first recess portion 302a (e.g., a first recess) and a second recess portion 302b (e.g., a second recess). Each of the first recess portion 302a and the second recess portion 302b may have a cylindrical shape (e.g., a cylindrical sidewall) corresponding to the shape of the ends of the plurality of battery cells 103. The first recess portion 302a may include a first sidewall portion 304a (e.g., a first sidewall or first cylindrical sidewall) having first crush points 306a (e.g., crush points) spaced apart from each other along the first sidewall portion 304a, as well as a first bottom portion 308a (e.g., first bottom). Similarly, the second recess portion 302b may include a second sidewall portion 304b (e.g., second sidewall or second cylindrical sidewall) having second crush points 306b spaced apart from each other along the second sidewall portion 304b, as well as a second bottom portion 308b (e.g., second bottom). As shown, the first and second crush points (306a, 306b) are ridges that protrude from the first and second sidewall portions (304a, 304b) and extend upwards from the first and second bottom portions (308a, 308b). In some embodiments of the present disclosure, the first and second crush points (306a, 306b) may extend at least halfway up the first and second sidewall portions (304a, 304b). In some embodiments of the present disclosure, the first and second crush points (306a, 306b) may extend to a lip of each of the first and second recess portions (302a, 302b). Although four of each of the first and second crush points (306a, 306b) are shown, each of the first and second recess portion (302a, 302b) may include any number of crush points (e.g., less or more than four). In some embodiments of the present disclosure, the first and second crush points (306a, 306b) may be omitted, depending on the specific requirements of a particular battery module.

As shown, portions of the recess where the first sidewall portion 304a meets the second sidewall portion 304b may form first and second convex portions (310a, 310b). As shown, the first and second sidewall portions (304a, 304b) do not extend between the first and second convex portions (310a, 310b). Put another way, the portion between the first and second convex portions (310a, 310b) may be "cutout" to allow potting to flow to one or more of the plurality of battery cells 103, as described in greater detail below. For example, because the first and second sidewall portions (304a, 304b) do not extend in the between the first and second convex portions (310a, 310b), which is adjacent to walls of a pair of battery cells 103, flow of the potting between the battery cells 103 and contact between the potting and the battery cells 103 may be increased. In some embodiments of the present disclosure, the first bottom portion 308a may include a first cutout 312a (e.g., a first opening) and the second bottom portion 308b may include a second cutout 312b (e.g., a second opening). Additionally, the first and second bottom portions (308a, 308b) may include a shared cutout 314 (e.g., a shared opening). The terminals (109 and 111) of the plurality of battery cells 103 may be connected to the current collector assembly 113 through the first and second cutouts (312a, 312b) and the shared cutouts 314. Additionally, as described in greater detail with reference to FIGS. 3C, 4, and 8, the shared cutout 314, along with the first and second partial sidewalls (304a, 304b), and configuration of the recesses 301 may allow for effective potting of the plurality of battery cells 103.

When a respective pair of the plurality of battery cells 103 (e.g., a first battery cell and a second battery cell) is pressed into the recess 301, the first and second crush points (306a, 306b) deform (e.g., modify their shape) so that each battery cell 103 of the pair of battery cells 103 is held at least partially in the respective first and second recess portions (302a, 302b) by interference fit. In some embodiments of the present disclosure, however, the interference fit is not sufficient to maintain the battery cell 103 in the desired position during the remainder of the assembly process, let alone during operation (e.g., in an electric vehicle). For example, the plurality of battery cells 103 may be spaced only 1.25 millimeters from each other. Accordingly, a UV-cure adhesive may be applied along the first and second sidewall portions (304a, 304b) before the pair of battery cells 103 are pressed into the recess 301. For example, dollops of the UV-cure adhesive may be spaced apart along the first and second sidewall portions (304a, 304b) between the first and second crush points (306a, 306b). In some embodiments of the present disclosure, the UV-cure adhesive may be applied to a select portion of the ends, e.g., the first ends 105, of the plurality of battery cells 103 before they are pressed into the recesses 301 of the cell carrier 115 (e.g., instead of 301).

Although, as set forth above, elements 302a, 302b, 304a, 304b, 308a, and 308b are described to as "portions" (e.g., "first recess portion 302a," "second recess portion 302b," etc.) this is only for convenience of description, and these elements may also be described as follows: first and second recesses (302a, 302b), first and second sidewalls (304a, 304b), first and second bottoms (308a, 308b). In this case, each recess 301 may be described as a pair of recesses 301.

Figure 3C:
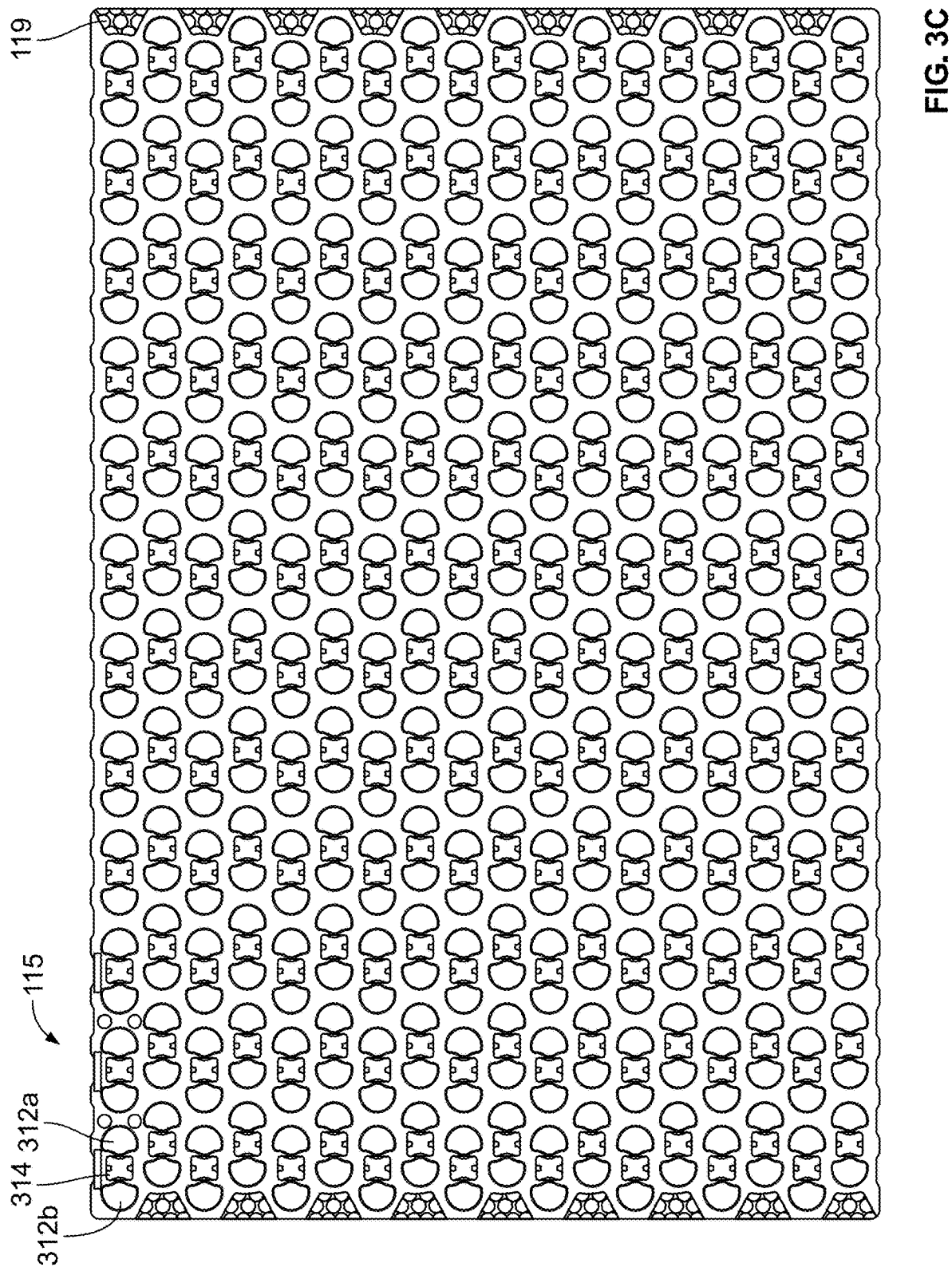
FIG. 3C shows a top view of a second side of the cell carrier before corresponding pairs of the plurality of battery cells are inserted, in accordance with some embodiments of the present disclosure.

FIG. 3C shows a top view of the second side 119 of the cell carrier 115 before corresponding pairs of the plurality of battery cells 103 are inserted, in accordance with some embodiments of the present disclosure. As shown, and as shown in greater detail with reference to FIG. 4, the configuration of the cell carrier 115 allows a potting material to flow down into the battery module 101 through the shared cutouts 314 (as well as the first and second cutouts (312a, 312b) in the cell carrier 115 to effectively pot the plurality of battery cells 103. Any one or a combination of the shared cutouts 314 and the first and second cutouts 312a, 312b may be referred to herein as one or more cutouts. In some embodiments, a potting material may be sprayed.

Figure 4:
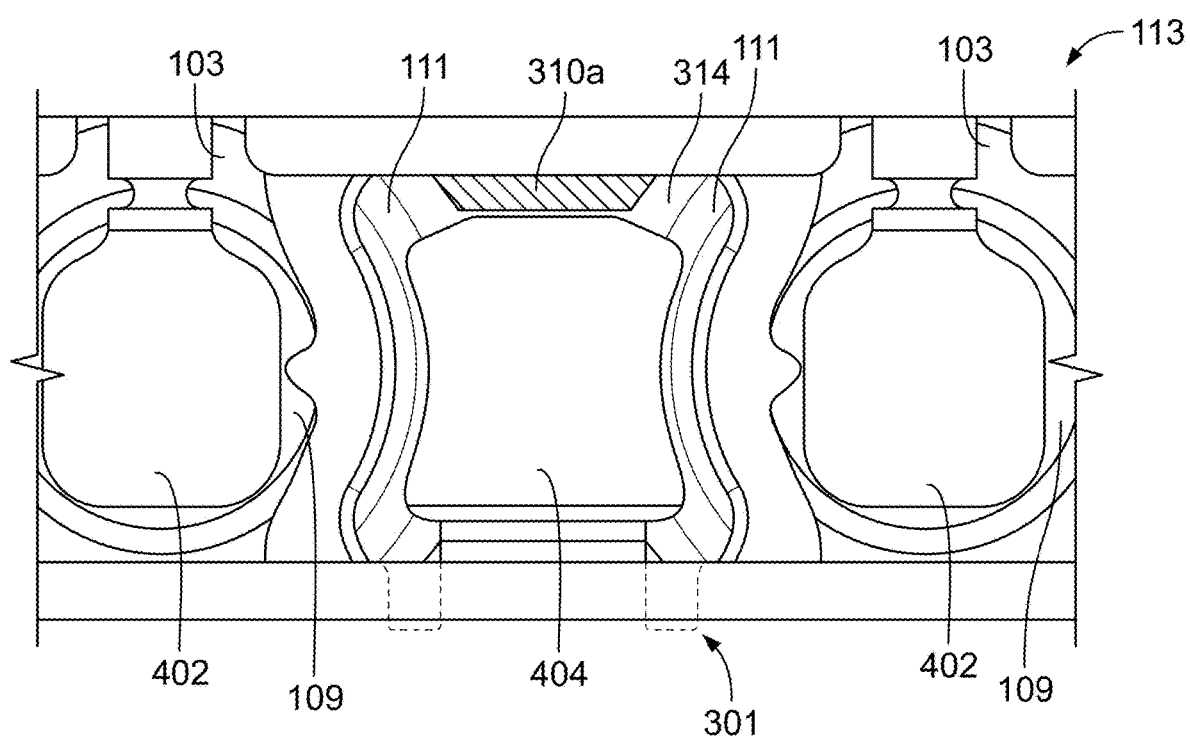
FIG. 4 shows a partial top view of a pair of battery cells inserted in one of the plurality of recesses 301 and connected to a current collector assembly, in accordance with some embodiments of the present disclosure.

FIG. 4 shows a partial top view of a pair of battery cells 103 inserted in one of the plurality of recesses 301 and connected to the current collector assembly 113, in accordance with some embodiments of the present disclosure. As shown, tabs 402 and 404, which are configured to connect electric terminals of the battery cells 103 to busbars of the current collector assembly 113, may be electrically coupled (e.g., via welding) to the first and second electric terminals (109, 111) of each battery cell 103 of the pair of battery cells 103 inserted into the respective recess 301 (e.g., the current collector assembly may be electrically coupled to a first center button terminal and first rim terminal of a first battery cell and to a second center button terminal and second rim terminal of a second battery cell of each pair of battery cells). As shown in greater detail with reference to FIG. 8, when potting material is disposed on a top surface of the battery module 101, the potting material may flow through the shared cutout 314 and pot the battery cells 103.

FIGS. 5-8 show a series of steps in a process for assembling the battery module 101, in accordance with some embodiments of the present disclosure. Each of the battery module components used in assembling the battery module 101 and described in the present disclosure may be provided by manufacturing or assembling the component itself, or obtaining the component from a supply of components. FIG. 5 shows the battery module 101 after pairs of the plurality of battery cells 103 have been coupled to respective recesses 301 of the plurality of recesses 301, the barrier layers 202 have been inserted between parallel groups the battery cells 103, the sidewalls 204 have been coupled to sides of the battery module 101, and the current collector assembly 113 has been attached to the second side 119 of the cell carrier 115, in accordance with some embodiment of the present disclosure. In some embodiments, the flex circuit 127 may be attached to the current collector assembly 113 before the current collector assembly 113 is coupled to the battery module 101. However, this is only an example, and the flex circuit 127 may be coupled to the current collector assembly 113 after the current collector assembly 113 is coupled to the battery module 101. As shown, the second ends 107 of the plurality of battery cells 103 may be exposed on a bottom surface of the battery module 101.

Figure 6:
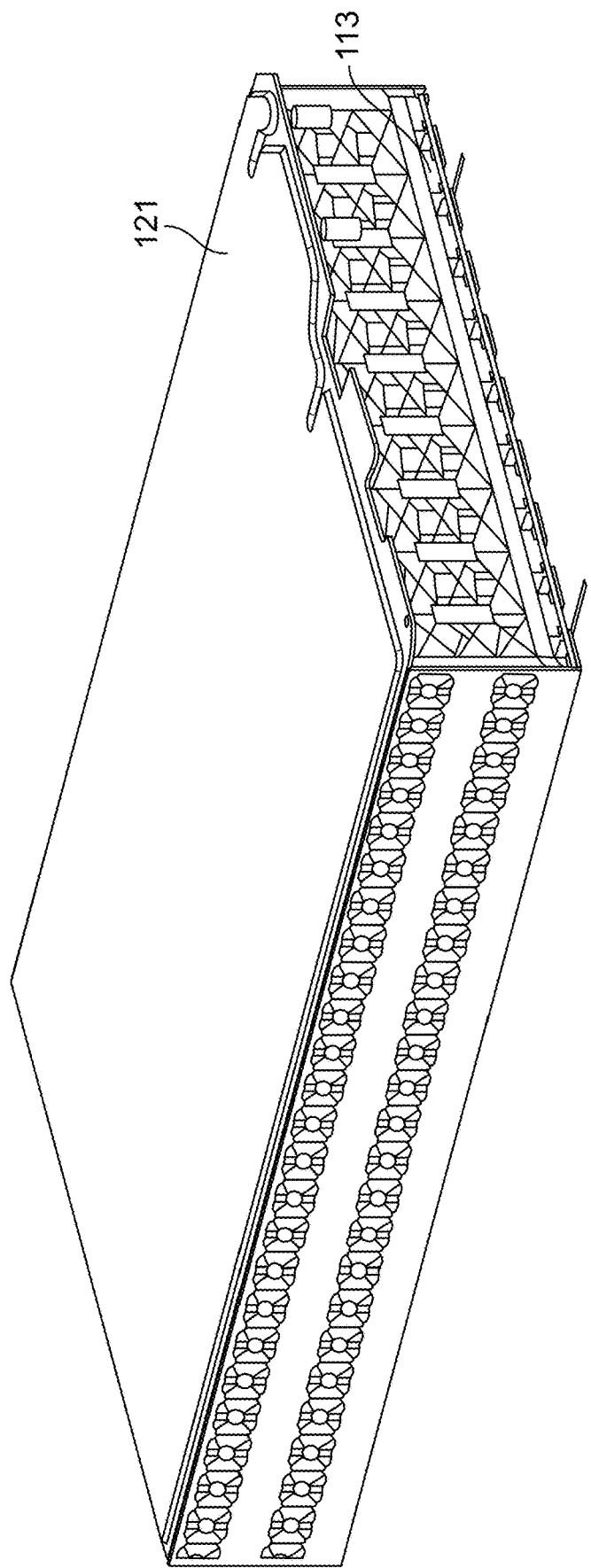
FIG. 6 shows the battery module assembly of FIG. 5 following the installation of a cooling plate, in accordance with some embodiments of the present disclosure.

FIG. 6 shows the battery module assembly of FIG. 5 following the installation of a cooling plate 121, in accordance with some embodiments of the present disclosure. In some embodiments of the present disclosure, a cooling surface of the cooling plate 121 is coupled to the exposed ends 107 of the plurality of battery cells 103 by the thermal interface material 125.

Figure 7:
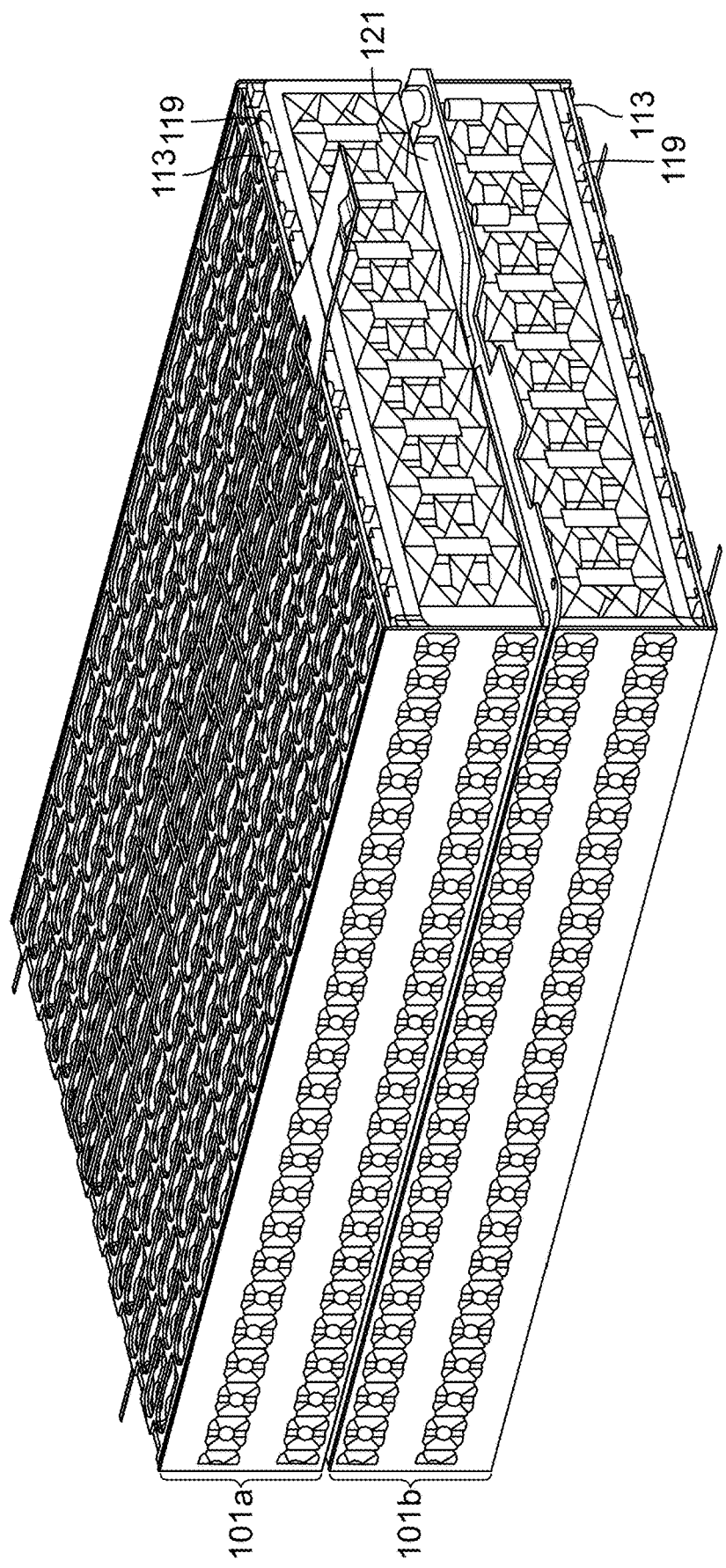
FIG. 7 shows a battery module made up of two submodules coupled to opposite sides of a cooling plate, in accordance with some embodiments of the disclosure.

FIG. 7 shows a battery module 101 made up of two submodules 101a, 101b coupled to opposite sides of the cooling plate 121, in accordance with some embodiments of the disclosure. For example, the battery module 101 shown in FIG. 6 may be the bottom submodule 101b of FIG. 7. It will be understood that a battery submodule 101a, 101b in accordance with the present disclosure may or may not include a cooling plate 121. That is, the term "submodule" may refer both to a battery module 101 as described above with or without a cooling plate component.

Figure 8:
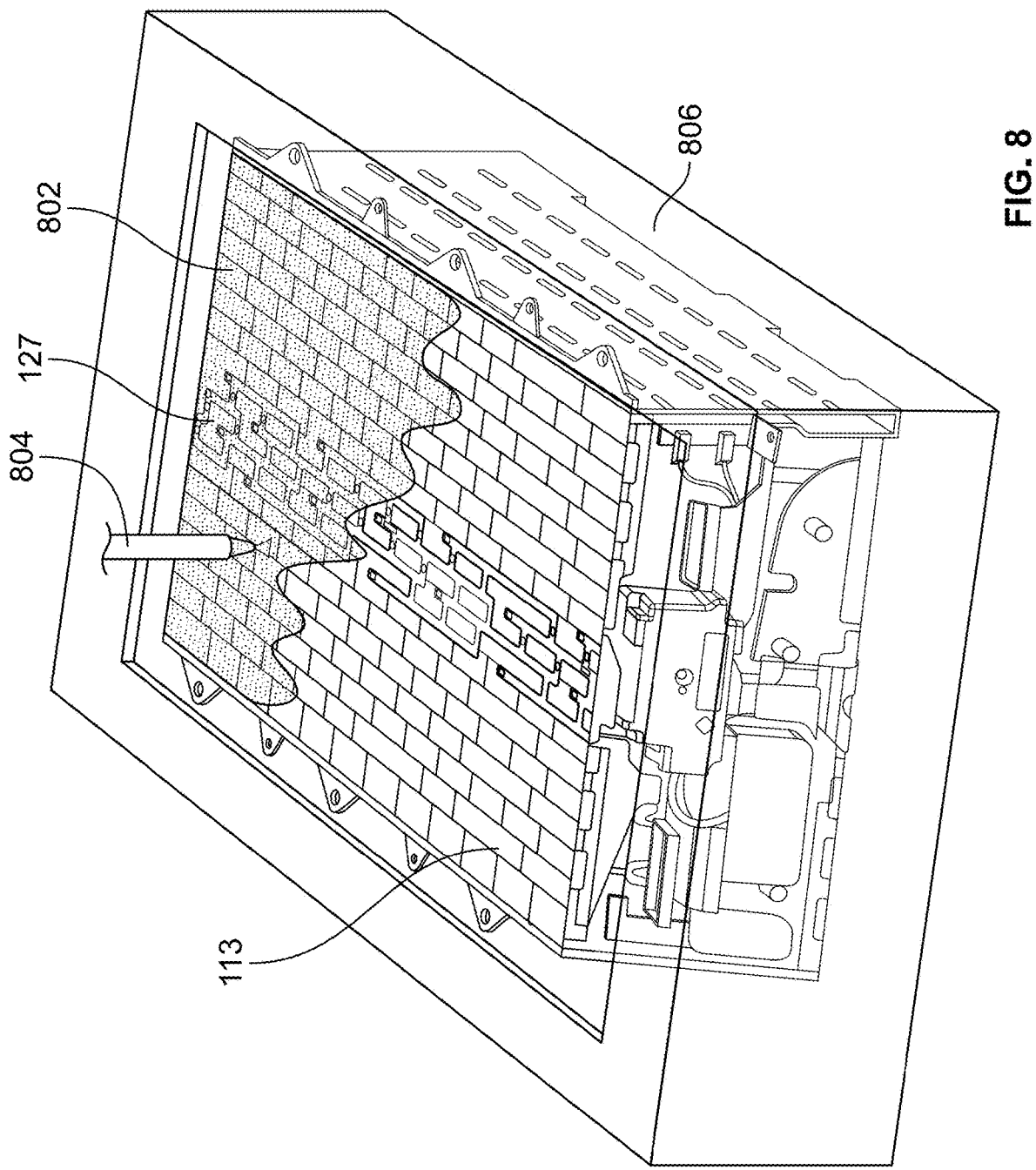
FIG. 8 shows the battery module assembly of FIG. 7, following the application of a potting material to a top surface of the submodule, in accordance with some embodiments of the present disclosure.

FIG. 8 shows the battery module assembly of FIG. 7, during the application of a potting material 802 (e.g., potting) to a top surface of the submodule 101a, in accordance with some embodiments of the present disclosure. As shown, the potting material 802 may be applied as a liquid (e.g., through a nozzle 804). In some embodiments, as the potting material 802 is being applied (or after the potting material 802 is applied but before the potting material 802 dries), the battery module assembly may be vibrated to improve the flow of the potting material 802 into the battery module assembly. For example, as shown, the battery module may be placed on a tray 806 which vibrates. As discussed above, the potting material 802 may flow through the shared cutouts 314 in the cell carrier 115 and between the plurality of battery cells 103 before setting to effectively pot the plurality of battery cells 103. After the potting material 802 sets (or partially sets), the battery module assembly may be turned over and potting material 802 applied to a top surface of the submodule 101b. Although only a portion of the top surface of the submodule 101a is shown as being covered by the potting material 802, this is simply for purposes of illustration, and the entire top portion of the top surface of the submodule 101a may be covered by the potting material 802. In some embodiments, the potting material 802 may be injected through each of the shared cutouts 314 in the cell carrier 115.

Figure 9:
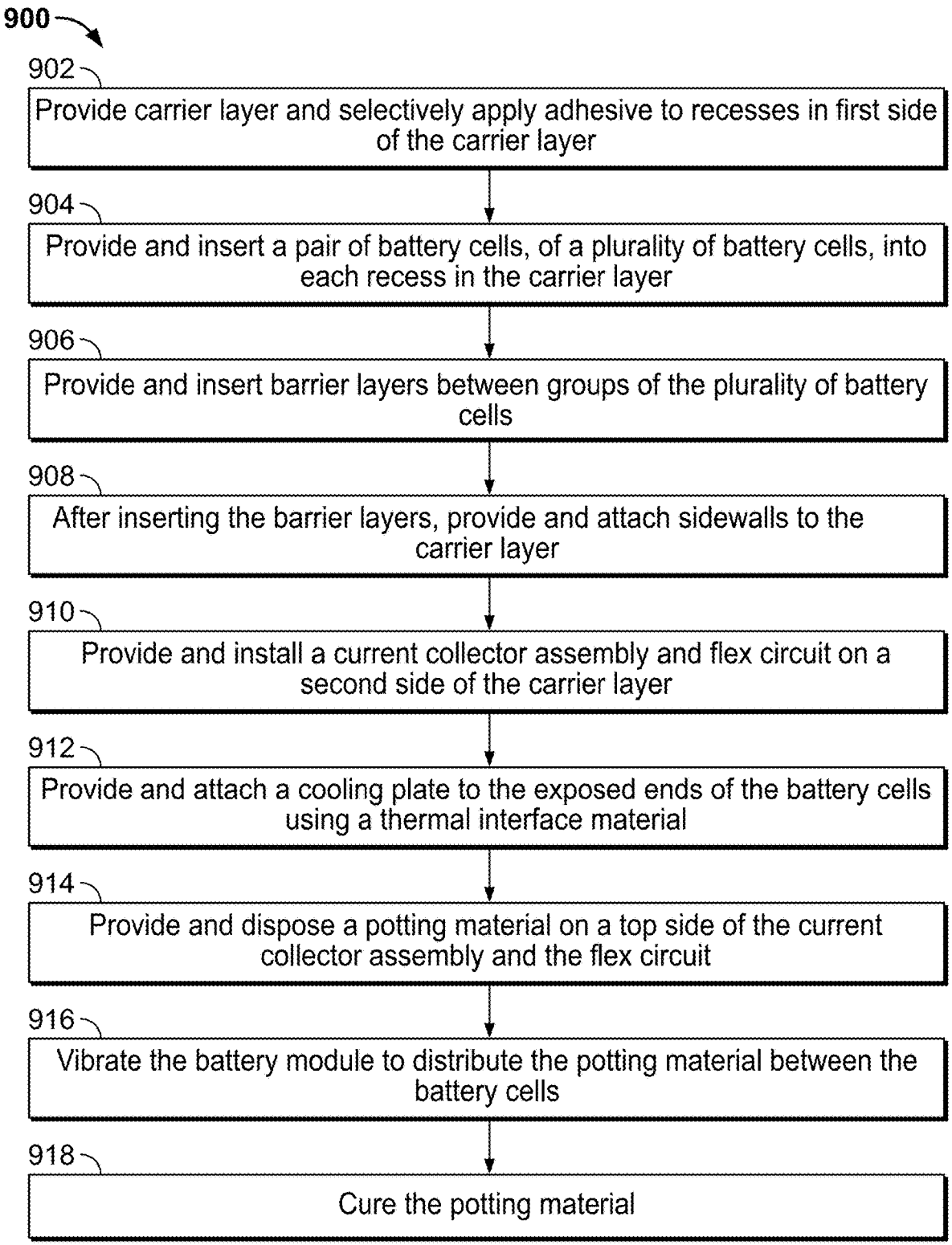
FIG. 9 shows a flowchart of an illustrative process for manufacturing a battery module, in accordance with some embodiments of the present disclosure.

FIG. 9 shows a flowchart of an illustrative process 900 for manufacturing the battery module 101, in accordance with some embodiments of the present disclosure.

At step 902, a cell carrier is provided and an adhesive (e.g., a UV-cure adhesive) is provided and selectively applied to recesses in a first side of the cell carrier. The adhesive may be applied to the recesses 301 of the first side 117 of the cell carrier 115, as described above in FIGS. 3A and 3B.

At step 904, pairs of battery cells are provided and inserted into each recess in the cell carrier. The pairs of battery cells may be pairs of the plurality of battery cells 103 inserted into the recesses 301 in the cell carrier 115.

At step 906, barrier layers are provided and inserted between groups of the plurality of battery cells. The barrier layers may be the barrier layers 202 inserted between parallel groups of the plurality of battery cells 103, as described above in FIG. 2. In some embodiments, the adhesive may be at least partially cured before inserting the plurality of barrier layers 202.

At step 908, after inserting the barrier layers, sidewalls may be provided and attached to the cell carrier (e.g., using an adhesive). The sidewalls may be the sidewalls 204 shown in FIGS. 2 and 5.

At step 910, a current collector assembly and flex circuit are provided and installed on a second side of the cell carrier. The current collector assembly may be the current collector assembly 113 installed on the second side 119 of the cell carrier 115, as shown in FIG. 2. In some embodiments, the flex circuit may be the flex circuit 127 and may be installed on the current collector assembly 113 before or after the current collector assembly is installed on the second side 119 of the cell carrier. In some embodiments, the adhesive securing the plurality of battery cells 103 to the cell carrier 115 may be fully cured before installing the current collector assembly.

At step 912, a cooling plate is provided and attached to exposed ends of the plurality of battery cells using a thermal interface material. The cooling plate may be the cooling plate 121 and may be attached to the second ends 107 of the plurality of battery cells 103 using the thermal interface material 125, as shown in FIGS. 1 and 6. In some embodiments, another battery submodule may be attached the other side (e.g., cooling surface) of the cooling plate 121, as shown in FIG. 7.

At step 914, a potting material is provided and disposed on a top side of the current collector assembly and the flex circuit. The potting material may be the potting material 802 and may be disposed on the top side of the current collector assembly 113 and the flex circuit 127. The potting material 802 may be applied as a liquid (e.g., through the nozzle 804) and may flow through the current collector assembly 113 and through the cutouts (e.g., the shared cutout 314, the first cutout 312a, and the second cutout 312b) in the cell carrier 115, as shown in FIGS. 3C, 4, and 8.

At step 916, the battery module is vibrated to distribute the potting material between the battery cells. The battery module may be the battery module 101, as shown in FIG. 8.

At step 918, the potting material may be cured. The potting material may be the potting material 802. In some embodiments, if the battery module 101 includes a plurality of submodules (e.g., 101a and 101b), the battery module 101 may be flipped over so that the potting material 802 may be applied to the other side of the battery module 101, as described above.

It will be understood that while process 900 was described in the context of manufacturing a battery module, process 900 may be used for manufacturing any module that requires potting battery cells after a module has been substantially assembled. It will also be understood that some of the steps of process 900 may be omitted or performed in a different order than as described above in FIG. 9. For example, in some embodiments of the present disclosure, step 910 may be performed in two separate steps; steps 908, 912, and/or 918 may be omitted; and step 910 may be performed after step 912.

The foregoing is merely illustrative of the principles of this disclosure and various modifications may be made by those skilled in the art without departing from the scope of this disclosure. The above-described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

What is claimed is:

1. A battery module comprising:
   a cell carrier comprising:
      a shared cutout;
      a first recess comprising a first sidewall and a first bottom; and
      a second recess comprising a second sidewall and a second bottom, wherein:
         the first recess is configured to receive a first battery cell of two or more battery cells;
         the second recess is configured to receive a second battery cell of the two or more battery cells;
         the first bottom and the second bottom comprise the shared cutout; and
         the shared cutout is configured to allow potting to flow to the two or more battery cells.

2. The battery module of claim 1, wherein the two or more battery cells comprises a first battery cell and a second battery cell, and wherein the shared cutout allows the potting to flow between the first battery cell and the second battery cell.

3. The battery module of claim 1, wherein the first sidewall comprises a first cylindrical sidewall for the first battery cell and the second sidewall comprises a second cylindrical sidewall for the second battery cell,
   wherein the first cylindrical sidewall and the second cylindrical sidewall form a convex portion, and
   wherein the convex portion allows the potting to flow between the first battery cell and the second battery cell.

4. The battery module of claim 1, further comprising a crush point in one of the first recess or the second recess configured to support one of the two or more battery cells, wherein the crush point is configured to modify its shape based on the one battery cell being inserted into the recess.

5. The battery module of claim 4, further comprising a second crush point configured to modify its shape based on the one battery cell being inserted in the one recess, wherein the crush point and the second crush point are spaced apart along a sidewall that supports the one battery cell.

6. The battery module of claim 1, wherein when the first battery cell is positioned in the first recess and the second battery cell is positioned in the second recess, the potting can be applied through the shared cutout to pot the first and second battery cells.

7. A battery module comprising:
a plurality of pairs of battery cells; and
a cell carrier comprising:
a plurality of recesses, each comprising:
a first recess portion comprising a first sidewall portion and a first bottom portion; and
a second recess portion comprising a second sidewall portion and a second bottom portion,
wherein:
the first bottom portion and the second bottom portion of each recess comprise a shared cutout; and
for each pair of battery cells, a first end of a first battery cell is coupled to the first recess portion and a first end of a second battery cell is coupled to the second recess portion of a respective recess.

8. The battery module of claim 7, further comprising a potting material disposed between the plurality of pairs of battery cells, wherein the potting material flows through the shared cutout before curing between the plurality of pairs of battery cells.

9. The battery module of claim 7, wherein:
the first sidewall portion comprises a first plurality of crush points spaced apart from each other along the first sidewall portion and protruding from the first sidewall portion such that the first plurality of crush points is configured to at least partially hold the first end of the first battery cell; and
the second sidewall portion comprises a second plurality of crush points spaced apart from each other along the second sidewall portion and protruding from the second sidewall portion such that the second plurality of crush points is configured to at least partially hold the first end of the second battery cell.

10. The battery module of claim 7, further comprising a current collector assembly, wherein rim terminals of each of the first battery cell and the second battery cell are electrically coupled to the current collector assembly through the shared cutout.

11. The battery module of claim 10, wherein:
the first bottom portion includes a first cutout and the second bottom portion includes second cutout;
a first center button terminal of the first battery cell is electrically coupled to the current collector assembly through the shared cutout or the first cutout; and
a second center button terminal of the second battery cell is electrically coupled to the current collector assembly through the shared cutout or the second cutout.

12. The battery module of claim 7, further comprising a cold plate, wherein for each pair of the battery cells, second ends of the first and second battery cells are coupled to the cold plate through a thermal interface material.

13. A method of manufacturing a battery module, comprising:
providing a cell carrier comprising:
a plurality of shared cutouts, wherein each shared cutout provides access to a pair of battery cells; and
a plurality of recesses, each comprising:
a first recess portion comprising a first sidewall portion and a first bottom portion; and
a second recess portion comprising a second sidewall portion and a second bottom portion, wherein:
the first recess portion is configured to receive a first battery cell of a pair of battery cells;
the second recess portion is configured to receive a second battery cell of the pair of battery cells; and
the first bottom portion and the second bottom portion of each recess comprise a shared cutout of the plurality of shared cutouts; and
dispensing a potting material to each of the plurality of shared cutouts to allow the potting material to flow to the respective pair of battery cells.

14. The method of claim 13, wherein:
the cell carrier comprises a first side and a second side opposite the first side, the first side comprising the plurality of recesses; and,
the method further comprises:
providing pairs of battery cells; and
inserting, for each of the respective pair of battery cells, a first end of a first battery cell into the first recess portion and a first end of a second battery cell into the second recess portion of a respective recess of the plurality of recesses.

15. The method of claim 14, further comprising attaching a current collector assembly to the second side of the cell carrier and electrically coupling portions of the current collector assembly to the pairs of battery cells.

16. The method of claim 15, further comprising attaching a cooling surface to a second end of each of the pairs of battery cells.

17. The method of claim 16, further comprising orienting the battery module into a first orientation in which the second side of the cell carrier is facing up, with respect to gravity,
wherein dispensing the potting material to each of the plurality of shared cutouts comprises applying the potting material to a top surface of the battery module when the potting material is a liquid.

18. The method of claim 17, further comprising:
vibrating the battery module before the potting material cures; and
curing the potting material.

* * * * *